United States Patent
Miettinen et al.

(10) Patent No.: US 6,754,834 B2
(45) Date of Patent: Jun. 22, 2004

(54) TECHNIQUE FOR GENERATING CORRELATION NUMBER FOR USE IN LAWFUL INTERCEPTION OF TELECOMMUNICATIONS TRAFFIC

(75) Inventors: Kari Miettinen, Helsinki (FI); Joonas Pylkkänen, Helsinki (FI)

(73) Assignee: Nokia Corporation, Espoo (FI)

( * ) Notice: Subject to any disclaimer, the term of this patent is extended or adjusted under 35 U.S.C. 154(b) by 208 days.

(21) Appl. No.: 09/990,328

(22) Filed: Nov. 23, 2001

(65) Prior Publication Data
US 2003/0101356 A1 May 29, 2003

(51) Int. Cl.[7] .................... H04L 12/56; H04L 12/26; H04L 9/00; H04Q 7/22; H04Q 7/34; H04M 3/22
(52) U.S. Cl. ............... 713/201; 455/405; 455/410; 380/247; 380/250; 713/150
(58) Field of Search .................. 713/200, 201; 455/405, 67.11, 410; 380/247–250, 270–275

(56) References Cited

U.S. PATENT DOCUMENTS 6,094,575 A * 7/2000 Anderson et al. ........... 455/422
6,122,499 A * 9/2000 Magnusson ................. 455/405

FOREIGN PATENT DOCUMENTS

WO    WO 01/19036 A1 * 3/2001 ........... H04L/12/56

* cited by examiner

Primary Examiner—Kim Vu
Assistant Examiner—Chi-Chung Lee
(74) Attorney, Agent, or Firm—Antonelli, Terry, Stout & Kraus, LLP

(57) ABSTRACT

A technique for generating a correlation number for use in lawful interception of telecommunications traffic includes handling one of either a "PDP (Packet Data Protocol) context activation" or "Start of intercept(ion) with PDP context active" event and generating a unique PDP-ID (PDP Context Identifier) in response thereto. An MCC (Mobile Country Code) and an MNC (Mobile Network Code) of a network operator is identified, as is a DF (Delivery Function)-ID of a DF. The MCC and MNC are combined to generate an Operator-ID. The generated PDP-ID and the generated Operator-ID and the DF-ID are combined to generate the correlation number.

27 Claims, 10 Drawing Sheets

FIG.5

| Octets | BITS | | | | | | | |
|---|---|---|---|---|---|---|---|---|
| | 8 | 7 | 6 | 5 | 4 | 3 | 2 | 1 |
| 1 | Version ("0 0 0") | | | "1" | Spare "1 1" | | DIR | "0" |
| 2 | Message Type (value 255) | | | | | | | |
| 3-4 | Length | | | | | | | |
| 5-6 | Sequence Number | | | | | | | |
| 7-8 | Not used (value 0) | | | | | | | |
| 9 | Not used (value 255) | | | | | | | |
| 10 | Not used (value 255) | | | | | | | |
| 11 | Not used (value 255) | | | | | | | |
| 12 | Not used (value 255) | | | | | | | |
| 13-20 | correlation number | | | | | | | |

FIG.6 (PRIOR ART)

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Charging-ID Octet 1 | | | | | | | | Charging-ID Octet 2 | | | | | | | | Charging-ID Octet 3 | | | | | | | | Charging-ID Octet 4 | | | | | | | |
| GGSN-ID | | | | | | | | | | | | | | | | | | | | | | | | | | | | | | | |

Octet 13 to 16
Octet 17 to 20

FIG.7

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| PDP-Id Octet 1 | | | | | | | | PDP-Id Octet 2 | | | | | | | | PDP-Id Octet 3 | | | | | | | | PDP-Id Octet 4 | | | | | | | |
| Operator-Id Octet 1 | | | | | | | | Operator-Id Octet 2 | | | | | | | | Operator-Id Octet 3 | | | | | | | | DF-Id | | | | | | | |
| MCC 0 | | | | MCC 1 | | | | MCC 2 | | | | MNC 0 | | | | MNC 1 | | | | MNC 2 | | | | | | | | | | | |

Octet 1-4
Octet 5-8

TECHNIQUE FOR GENERATING CORRELATION NUMBER FOR USE IN LAWFUL INTERCEPTION OF TELECOMMUNICATIONS TRAFFIC

BACKGROUND OF THE INVENTION

1. Field of the Invention

The present invention relates to telecommunications security and more particularly, the present invention relates to a technique for generating a correlation number for use in the lawful interception of telecommunications traffic, specifically, for use with GSM GPRS (General Packet Radio Service)/UMTS (Universal Mobile Telecommunication System) PS (Packet Switched) domain LI (Lawful Interception) data.

2. Description of Related Art

LEAs (Law Enforcement Agencies) throughout the world have used the lawful interception of communications between criminals and their co-conspirators and between groups of terrorists to thwart their criminal activities. In the past, when only telephone land line services were available, lawful wire-tapping of a telephone of a target entity was used, subject to the laws of the country in which the wire-tapping occurred.

Nowadays, with the advancement in technology and with the increased sophistication of both criminals and terrorists, it has become necessary to develop techniques to lawfully intercept more advanced telecommunications traffic. For example, it is the necessary to develop techniques for the lawful interception of GSM GPRS/UMTS PS domain LI data traffic.

In view of the fact that telecommunications traffic now reaches across countries and spans the globe, standards have been developed and are being developed by various international organizations to standardize lawful interception techniques of telecommunications traffic. For example, the European Telecommunications Standards Institute has produced standards by its ETSI Technical Committee Security (SEC), including ETSI Standard ES 201 158 V1.1.2, dated May, 1998, and ETSI Standard ES 201 671 V2.1.1, dated September, 2001. These standards, respectively entitled Telecommunications security: Lawful Interception (LI); Requirements for network functions and Telecommunications security; Lawful Interception (LI); Handover interface for the lawful interception of telecommunications traffic, disclose the general requirements of Network Operators (NWOs), Service Providers (SPs) and Access Providers (APs) relating to the provision of lawful interception, with particular reference to the Handover Interface (HI). The provision of lawful interception is a requirement of national law, which is usually mandatory. From time to time, an NWO and/or SP will be required, according to a lawful authorization, to make available results of an interception, relating to specific identities, to a specific LEA. Furthermore, these standards specify the generic flow of information as well as the procedures and information elements which are applicable to any telecommunication network or service. The two aforesaid standards are publicly available on the Internet at the Web Site of the European Telecommunication Standards Institute at http://www.etsi.org and the contents of these two standards are incorporated by reference herein in their entirety.

Similarly, the $3^{rd}$ Generation Partnership Project (3GPP) group has produced their own standards relating to the same subject matter as the two aforesaid standards from the European Telecommunication Standards Institute. 3GPP Standard TS 33.107 V5.0.0, dated June 2001, and entitled $3^{rd}$ Generation Partnership Project; Technical Specification Group Services and System Aspects; 3G Security; Lawful Interception Architecture and Functions (Release 5) and 3GPP Standards TS 33.108 V0.1.0, issued for approval on October 2001, and entitled 3rd Generation Partnership Project; Technical Specification Group Services and System Aspects; 3G Security; Handover Interface for Lawful Intercept (Release 5), similarly disclose the architecture and functional requirements of lawful interception of telecommunications traffic as related to a $3^{rd}$ Generation Mobile Communication System (3GPP MS) and further disclose the handover interfaces for lawful interception of Packet-Data Services, Circuit Switched Services, and Multimedia Services within the UMTS including the delivery of Intercept Related Information (HI2) and Content of Communication (HI3) to the Law Enforcement Monitoring Facility. These two standards are publicly available on the Internet at the Web Site of the $3^{rd}$ Generation Partnership Project at http://www.3gpp.org and the contents of these two standards are incorporated by reference herein in their entirety.

The problems in prior art systems arise in implementing the GSM GPRS/UMTS PS domain LI correlation between CC (Content of Communication) and IRI (Intercept Related Information). The specifications require that the system should provide a correlation number for this purpose. The correlation number should be unique per PDP context and is used to correlate CC with IRI and the different IRIs of one PDP context.

Current specifications propose that the Correlation Number should be composed of e.g. Charging ID+GGSN IPv4/IPv6 address. Because the IPv6 addresses consist of 128 bits the correlation number becomes very long and consists of 8 or 20 octets depending on whether IPv4 or IPv6 address is used. This means that either 8 or 20 octets are consumed in every IRI or CC packet to be transmitted towards the LEA (Law Enforcement Agency). Another problem in current proposal is that the GGSN IP address must be an public IP address to assure the uniqueness of GGSN ID.

SUMMARY OF THE INVENTION

It is an object of the present invention to generate a correlation number for use in the lawful interception of telecommunications traffic.

In the present invention, one of either a "PDP context activation" event or "Start of intercept(ion) with PDP context active" event is handled and a unique PDP-ID (PDP Context Identifier) is generated in response thereto. PDP context activation is a procedure in which the serving GPRS support node (SGSN) together with the gateway GPRS support node (GGSN) that the subscriber will be using establishes a PDP context for routing purposes. An MCC (Mobile Country Code) and an MNC (Mobile Network Code) of a network operator are identified, as is a DF-ID of a DF (Delivery Function) The MCC and MNC are combined to generate an Operator-ID which is combined with the DF-ID and the generated PDP-ID to generate a correlation number.

The PDP-ID may consist of four octets while the Operator-ID may consist of three octets and the DF-ID may consist of one octet.

A unique PDP-ID (PDP Context Identifier) may be generated by incrementing a PDP-ID of a previous "PDP context activation" or "Start of intercept (ion) with PDP context active" event and comparing a resultant PDP-ID with all PDP-IDs in use and continuing incrementing until a resultant PDP-ID is different from all PDP-IDs in use.

A network including a correlation number generator to generate a correlation number for use in lawful interception of telecommunications traffic may include: at least one LEA (Law Enforcement Agency); and an IIF (Internal Interception Function) including DFs (Delivery Functions) to transmit lawfully intercepted communications traffic to the LEA, the correlation number generator being included in the DFs and including: a handler/generator to handle one of either a "PDP (Packet Data Protocol) context activation" or "Start of intercept(ion) with PDP context active" event and to generate a unique PDP-ID (PDP Context Identifier) in response thereto; a first identifier to identify an MCC (Mobile Country Code) of a network operator; a second identifier to identify an MNC (Mobile Network Code) of the network operator; a third identifier to identify a DF (Delivery Function)-ID of a DF; a first combiner/generator to combine the MCC and MNC to generate an Operator-ID; and a second combiner/generator to combine the generated PDP-ID and the generated Operator-ID and the DF-ID to generate a correlation number.

In one embodiment of the invention, the network further comprises a LEMF (Law Enforcement Monitoring Facility) to transmit lawfully intercepted telecommunications traffic to the at least one LEA, an IRI (Intercept Related Information) MF (Mediation Function) to forward IRI of lawfully intercepted telecommunications traffic to the at least one LEA via the LEMF, and a CC (Content of Communication) MF to forward CC of lawfully intercepted telecommunications traffic to the at least one LEA via the LEMF.

One advantage of the invention is that the correlation number is always 8 octets long (instead of 20 octets if prior art proposals are used with IPv6 addresses). A further advantage of the invention is that the generating of the correlation number does not require any GGSN-specific information. Because the correlation number consist only 8 octets instead of 20 octets, the overall performance of the HI2 and HI3 interfaces between DF and LEA is improved. Still another advantage of the invention is that the correlation number is always unique (while the prior art proposals for GGSN ID are unique only if the GGSN IP address is unique i.e. a public IP address).

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein:

FIG. 5 illustrates an outline of a GLIC header.

FIG. 6 illustrates an outline of a prior art correlation number.

FIG. 7 illustrates an outline of a correlation number in accordance with an embodiment of the present invention.

DETAILED DESCRIPTION

Figure 1:
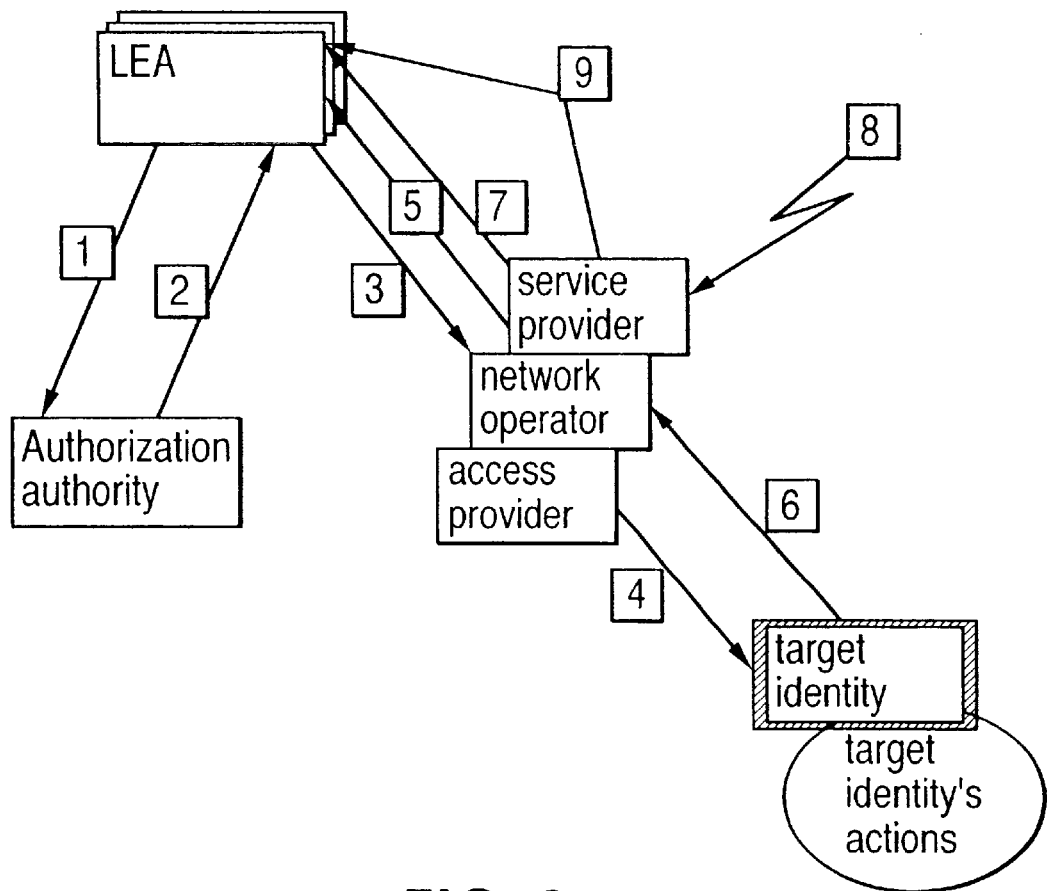
FIG. 1 illustrates a functional role model for the lawful interception of telecommunications traffic.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, arrangements may be shown in block diagram form in order to avoid obscuring the invention and also in view of the fact that specifics with respect to implementation of such block diagram arrangements are highly dependent upon the platform within which the present invention is to be implemented, that is, such specifics should be well within the purview of one skilled in the art. Where specific details have been set forth in order to describe example embodiments of the invention, it should be apparent to one skilled in the art that the invention can be practice without or with variations of these specific details. Finally, it should be apparent that differing combinations of hard-wired circuitry and software instructions can be used to implement embodiments of the present invention. That is, the present invention is not limited to any specific combination of hardware and software.

FIG. 1 illustrates a functional role model for the lawful interception of telecommunications traffic. As illustrated in FIG. 1, one or more LEAs are functionally connected to an authorization authority and to at least one of a service provider or network operator or access provider. The at least one of the service provider or network operator or access provider are functionally connected to a target identity, that is, an entity whose telecommunications traffic is to be monitored by at least one of the LEAs.

The authorization authority is a judicial or administrative authority which provides the LEAs with a lawful authorization to intercept telecommunications traffic of an interception subject.

An LEA requests a network operator or service provider or access provider to intercept communications of the interception subject according to the lawful authorization from the administrative authority and receives, through a Law Enforcement Monitoring Facility, the results of the interception, such as the content of the communications traffic and Intercept Related Information related thereto. Several LEAs may possibly request the interception of telecommunications traffic of the same interception subject.

The network operator operates the basic switched telecommunications network on which services are connected and is responsible for providing interception data to the LEAs via the Handover Interface. Several network operators may be involved in interception with the same LEAs.

The service provider provides services, additional to those provided by any network itself, to users of a network. A service provider may use and administer various identities which are, of themselves, unknown to the network. The service provider is responsible for making arrangements, which may involve a network operator, for the lawful interception of communications. A service provider may be the same organization as the network operator and interception may be required for several service providers using the same telecommunication network.

The access provider provides the user of the network with access from the user's terminal to the network and may be the same organization as the network operator. Several access providers may provide access to the same network.

The target identity corresponds to the identity of a given interception subject which is a user of a given service offered by an access provider or network operator or service provider. Neither the interception subject nor the other parties involved in his communications traffic are able to detect that an interception is taking place.

Referring to FIG. 1, in step 1, one of the LEAs requests a lawful authorization from an authorization authority to intercept communications traffic from an interception subject and in step 2, the authorization authority issues a lawful authorization to the LEA in response thereto.

In step 3, the LEA forwards the lawful authorization to at least one of the service provider or network operator or access provider which determines the relevant target identity or identities of the interception subject from the information provided in the lawful authorization of the authorization authority.

In step 4, the service provider or network operator or access provider causes interception mechanisms to be applied to the relevant target identity or identities and in step 5, forwards an acknowledgement to the LEA to confirm that the lawful authorization has been received and acted upon.

In step 6, the Intercept Related Information and content of any communications are forwarded via the interception mechanisms from the target identity to the service provider or network operator or access provider and subsequently forwarded to the LEA via the Law Enforcement Monitoring Facility (not shown in FIG. 1) in step 7.

In step 8, either on a request from the LEA or upon the period of authority of the lawful authorization having expired, the service provider or network operator or access provider ceases the interception of traffic for the target identity or identities and forwards an acknowledgement thereof from the service provider or network operator or access provider to the LEA (step 9).

Figure 2:
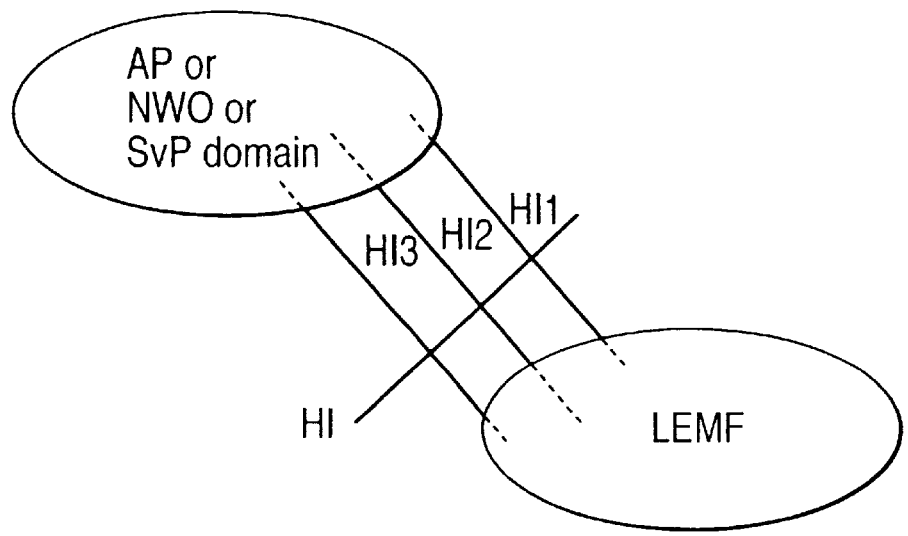
FIG. 2 illustrates a diagram showing the handover interface HI between an Access Provider (AP) or Network Operator (NWO) or Service Provider (SvP) domain and a Law Enforcement Monitoring Facility (LEMF).

FIG. 2 illustrates a diagram showing the handover interface HI between an Access Provider (AP) or Network Operator (NWO) or Service Provider (SvP) domain and a Law Enforcement Monitoring Facility (LEMF). The HI is defined to be a physical and logical interface across which the results of the interception are delivered from the access provider or network operator or service provider to an LEMF.

As shown in FIG. 2, the HI is divided into three ports, namely, HI1, HI2, and HI3. The first HI port HI1 is used to transfer various administrative information between the access provider or network operator or service provider and the LEA via the LEMF. The second HI port HI2 is used to transfer IRI (Intercept Related Information) from the access provider or network operator or service provider to the LEA via the LEMF. The third HI port HI3 is used to transport the content of the intercepted communication from the access provider or network operator or service provider to the LEA via the LEMF Administrative information, transferred via HI1, includes requests to establish or remove the interception action from the LEA to the access provider or network operator or service provider and the acknowledgement thereof back to the LEA. It further includes status reports covering all types of alarms, reports, or information related to the intercept function and may include: target identity remove from service, target identity has changed within the network, bulk modification of subscriber numbers, individual modification of subscriber number, new MSN (Multiple Subscriber Number) creation, LI database lost, and general setup failure. It may also include status reports indicating transmission problems such as: LEMF transmission problems, LEMF busy, no answer from LEMF, and transmission of IRI to the LEMF not possible.

IRI, transferred via HI2, includes signaling information used to establish the telecommunications service and to control its progress, for example, target identification, identification is of the other parties of a communication, basic service used, direction of the call or the event, cancel indication and/or release causes, and time stamps. Further information, such as supplementary service information or location information may be included.

The content of communication, transferred via HI3, includes information exchanged between two more uses of a telecommunication service, excluding IRI. This includes information which may, as part of some telecommunication service, be stored by one user for subsequent retrieval by another.

Figure 3:
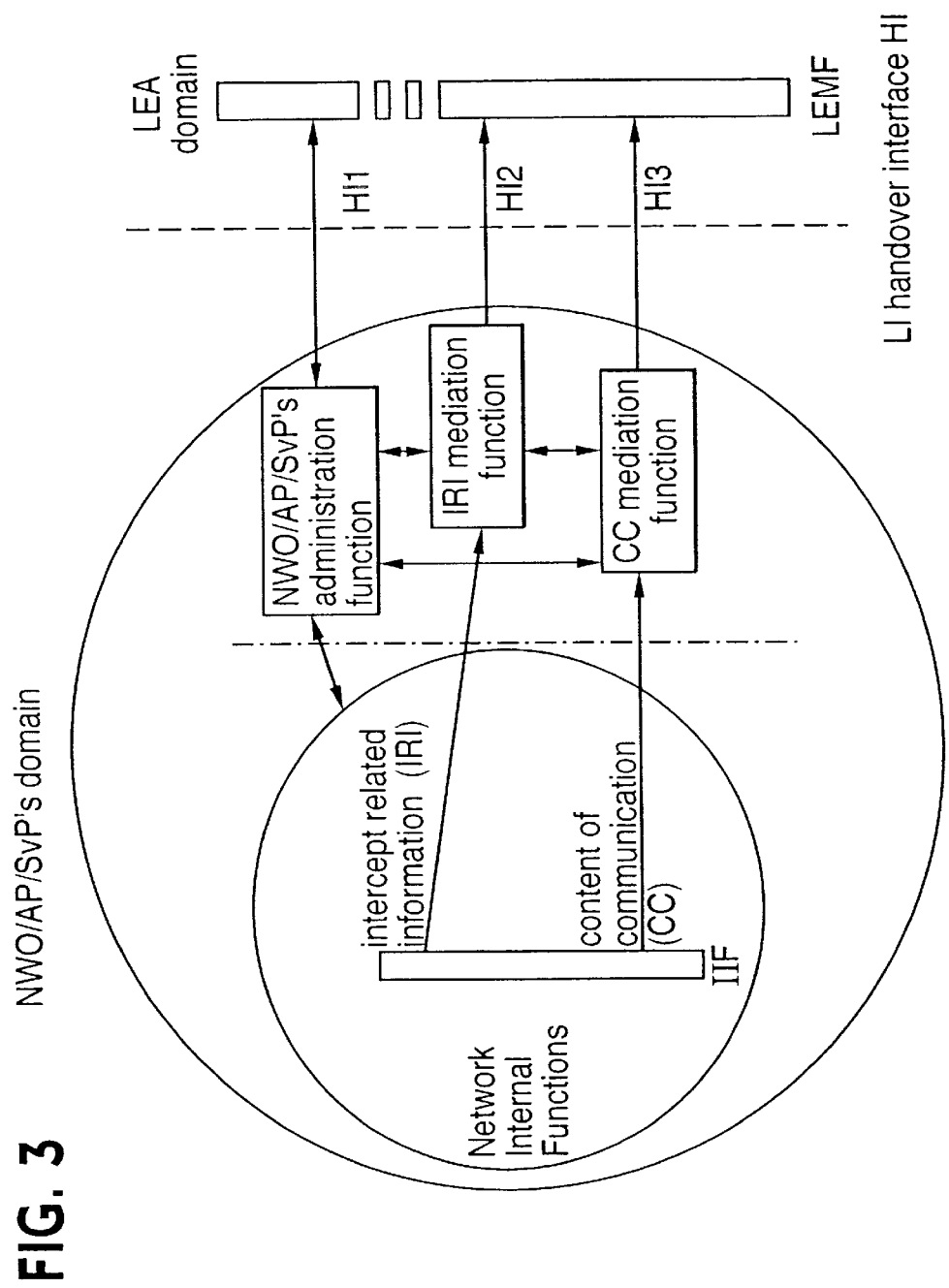
FIG. 3 illustrates a reference configuration for the lawful interception of telecommunications traffic.
Figure 4:
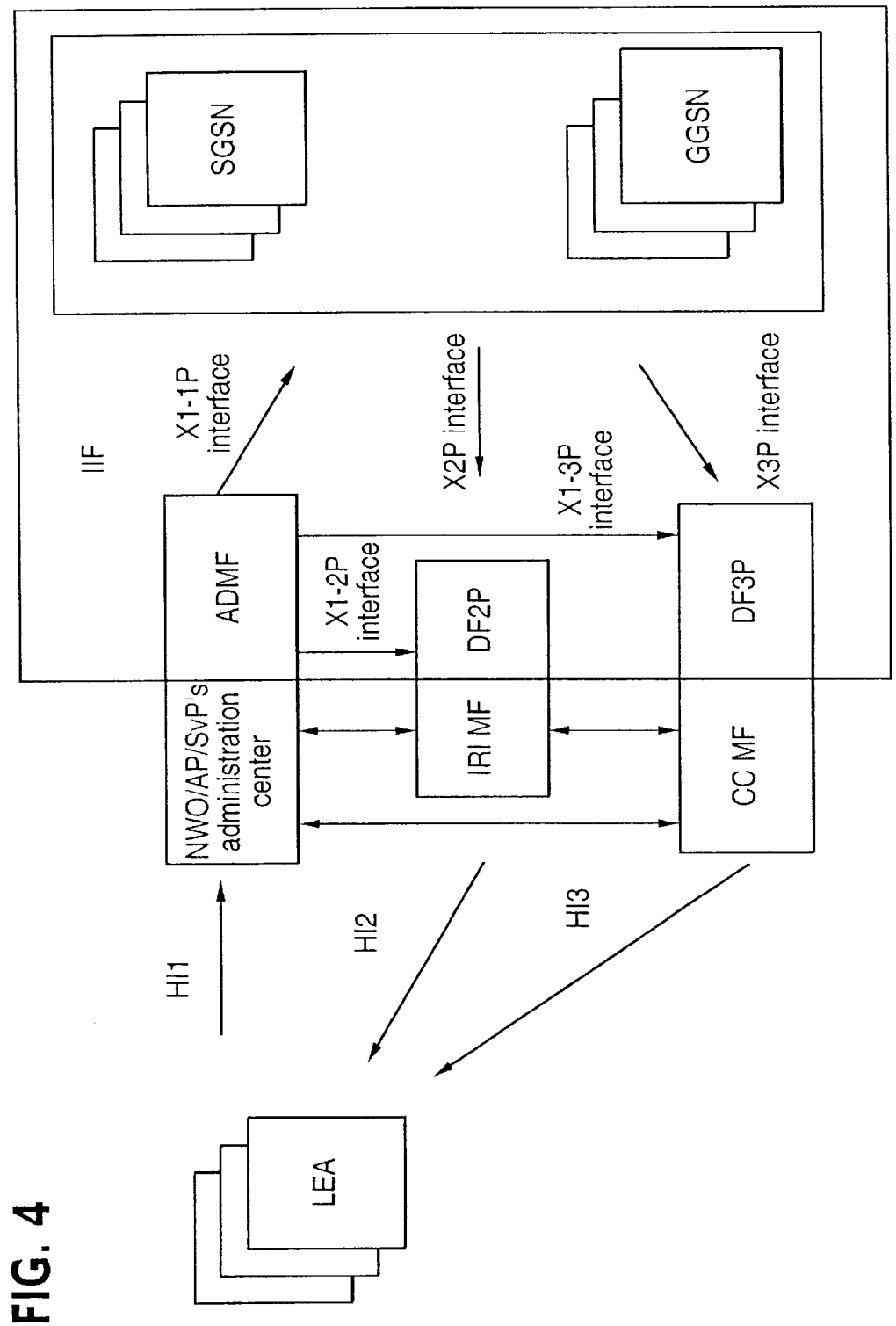
FIG. 4 illustrates a functional block diagram showing the handover interface HI.

FIG. 3 illustrates a reference configuration for the lawful interception of telecommunications traffic and FIG. 4 illustrates a functional block diagram showing the handover interface HI. The LEMF, disposed between the LEAs and the other elements, has been omitted from FIG. 3 for the sake of clarity.

The IIF is defined to be a point within a network or network element at which the content of communication and the intercept related information are made available. The mediation function MF is defined to be a mechanism which passes information between a network operator or access provider or service provider and a handover interface and passes information between the internal network interface and the handover interface. The ADMF (Administration Function) is used to hide information from the SGSN or GGSN that there might be multiple activation by different to LEAs on the same target identity. Various interfaces and delivery functions DFs are also illustrated. A communication could be intercepted based on several identities of the same target and for the delivery of the CC and IRI, the SGSN or GGSN provides there a correlation number and a target identity to the delivery functions DF2P and DF3P which are used to select the different LEAs where the CC/IRI shall be delivered to.

A GPRS LI correlation header may be used for delivery of content of communication to the LEMF. The header includes a correlation number, message type, direction, sequence number and length. As defined in the afore cited ES 201 671 V2.1.1 and illustrated in FIGS. 5 and 6, octets 13–20 of the GLIC (GPRS LI Correlation) header are used for the correlation number. Furthermore, as further defined therein, the correlation number consists of the Charging-ID assigned uniquely to each PDP context activation on the GGSN and the GGSN-ID.

Unfortunately, this requires GGSN-specific information and in addition, the correlation number may not be unique since the GGSN-ID is unique only if the GGSN IP address is a public IP address.

Accordingly, in accordance with the present invention, a correlation number is created which is unique per PDP context at which can be used to correlate CC with IRI and the different IRIs of one PDP context.

FIG. 7 illustrates the outline of a correlation number in accordance with the present invention. Note, as shown in FIG. 7, the charging ID octets of the FIG. 6 have been replaced by PDP-ID octets of FIG. 7 and the GGSN ID octets of FIG. 6 have been replaced by the Operator-ID octets and DF-ID octet of FIG. 7. The PDP-ID (PDP Context Identifier) uniquely identifies each PDP context and is created and maintained by the DF (Delivery Function) without requiring any GGSN-specific information. The Operator-ID consists of the MCC (Mobile Country Code) and MNC (Mobile Network Code) of the operator and uniquely identifies the operator. The DF-ID identifies the DF inside the network of one operator and is allocated by the operator itself.

As noted above, the PDP-ID is created and maintained by the DF and can be, for example, an ordinary 32-bit unsigned integer counter variable which is incremented upon each successful "PDP context activation" and "Start of intercept (ion) with PDP context active" event handled by the DF. The counter values are maintained by the DF for each active PDP context and are used in subsequent IRI and CC data belonging to the same PDP context for correlation purposes. The only caveat is that the DF must keep track of the PDP-IDs in use so as to prevent duplicate PDP-IDs for different PDP contexts.

Figure 8:
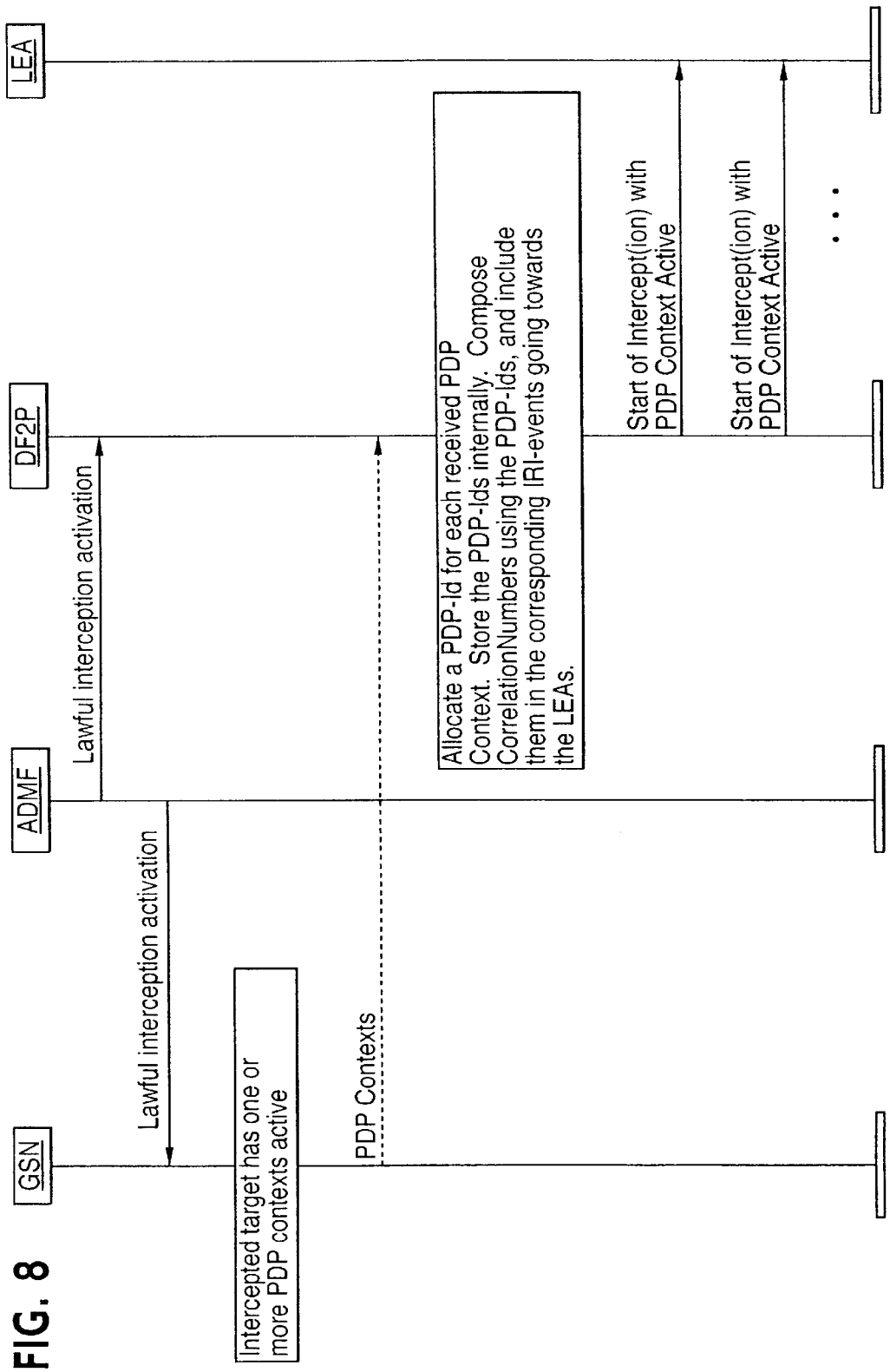
FIG. 8 illustrates start of interception with PDP context active in accordance with an embodiment of the present invention.

FIG. 8 illustrates handling of "Start of intercept (ion) with PDP context active" event in accordance with the present invention. As illustrated in FIG. 8, initially a lawful interception activation is forwarded from the ADMF to the delivery function DF2P. The ADMF also forwards a lawful interception activation to a GGSN or SGSN (shown as GSN) in FIG. 8. The GGSN or SGSN then determines that the intercepted target has one or more PDP contexts active and then forwards the PDP contexts to the DF2P. The DF2P allocates a PDP-ID for each received PDP context and stores the PDP-IDs internally. The DF2P then composes the correlation numbers by using these PDP-Ids, and includes them in the corresponding "Start of intercept (ion) with PDP context active" events, and forwards each event to the LEA.

Figure 9:
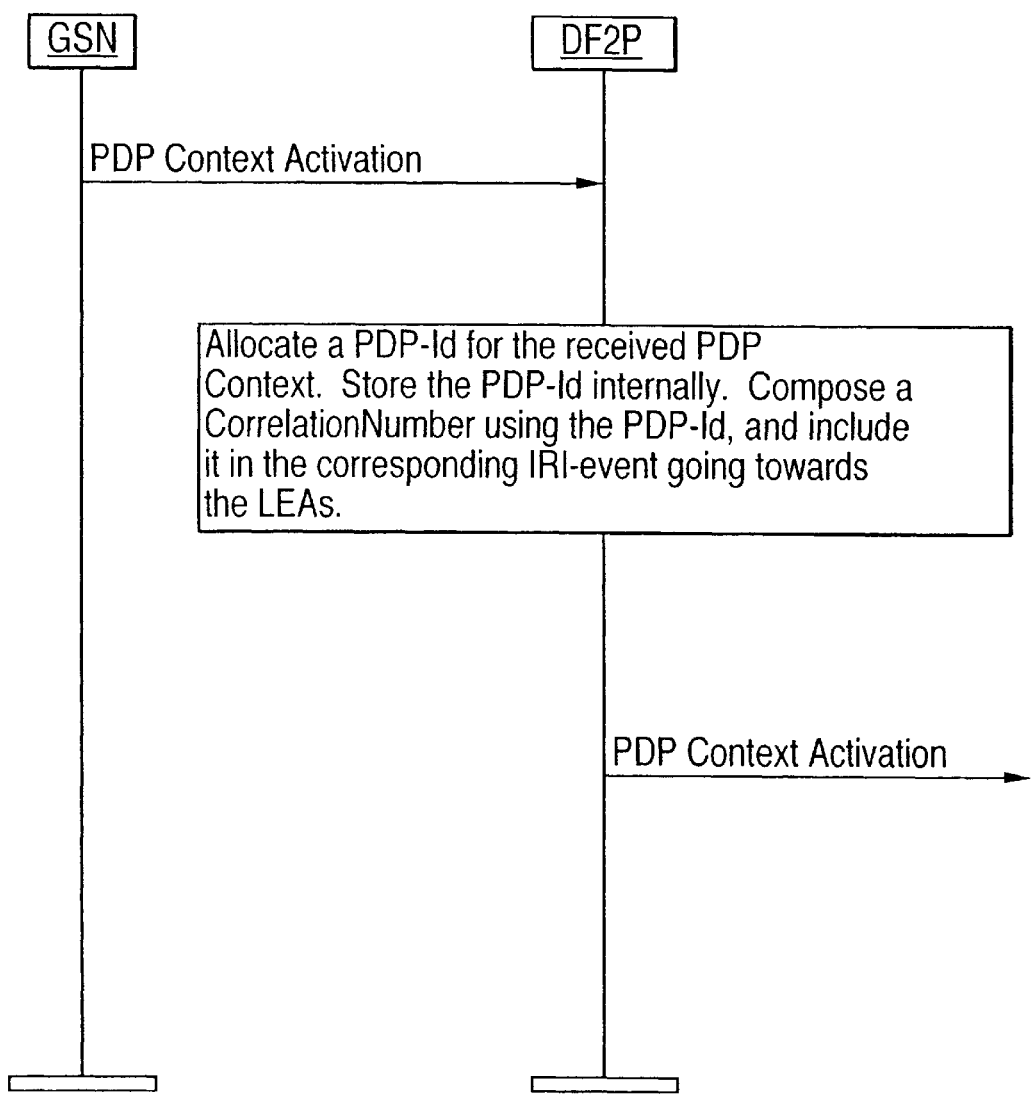
FIG. 9 illustrates PDP context activation in accordance with an embodiment of the present invention.

Alternatively, FIG. 9 illustrates handling of "PDP context activation" event in accordance with the present invention. As illustrated in FIG. 9, initially, a PDP context activation is forwarded from the GGSN or SGSN to the delivery function DF2P which then operates in the same fashion as in FIG. 8, forwarding the "PDP context activation" event to the LEA.

Figure 10:
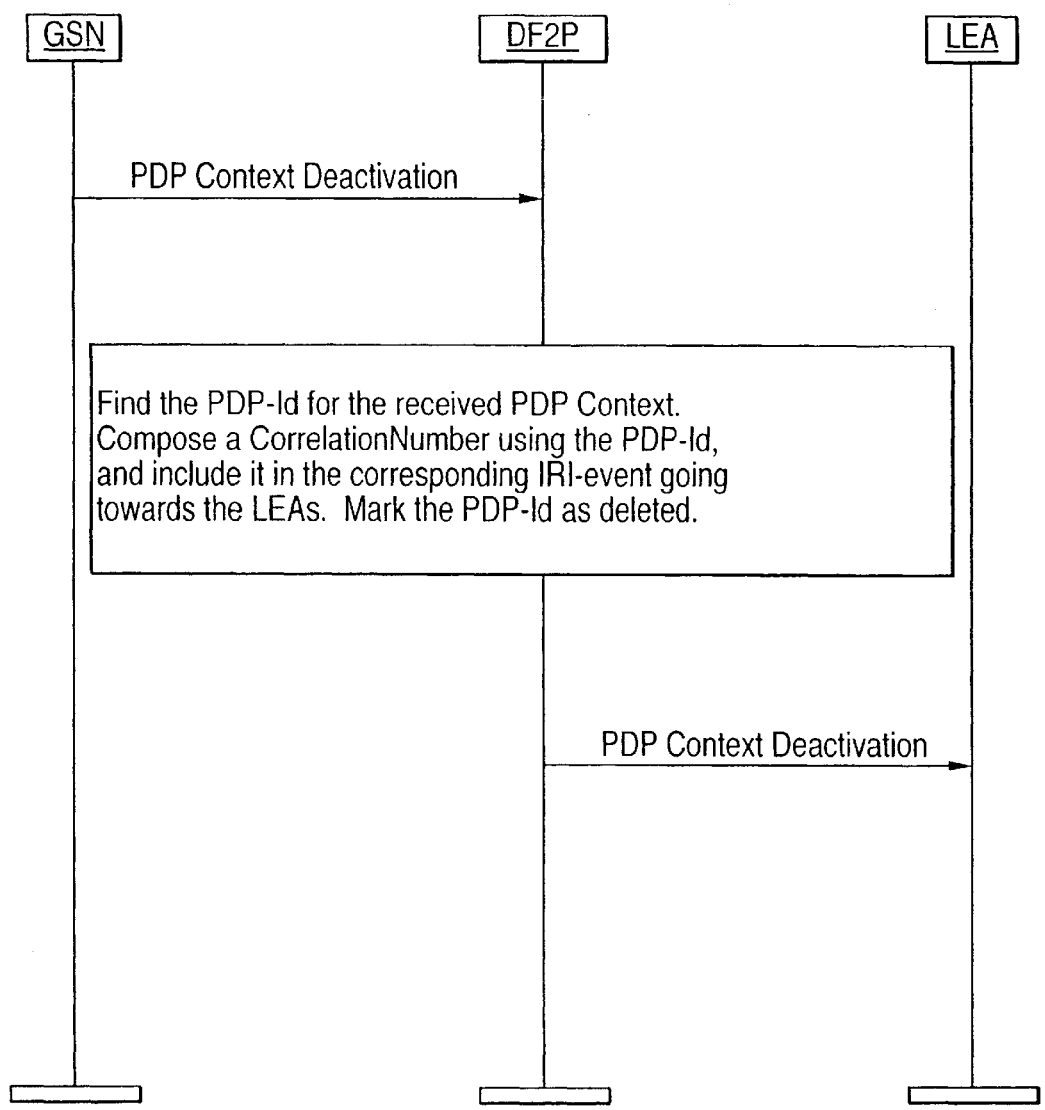
FIG. 10 illustrates PDP context deactivation in accordance with an embodiment of the present invention.

FIG. 10 illustrates handling of "PDP context deactivation" event in accordance with the present invention. As illustrated in FIG. 10, a PDP context deactivation is forwarded from the GGSN or SGSN to the delivery function DF2P. The DF2P finds the PDP-ID for the received PDP context and composes a correlation number using the PDP-ID and includes it in the corresponding IRI event to be forwarded to the LEA, marking the PDP-ID as being deleted. The "PDP context deactivation" event is then forwarded to the LEA.

Figure 11:
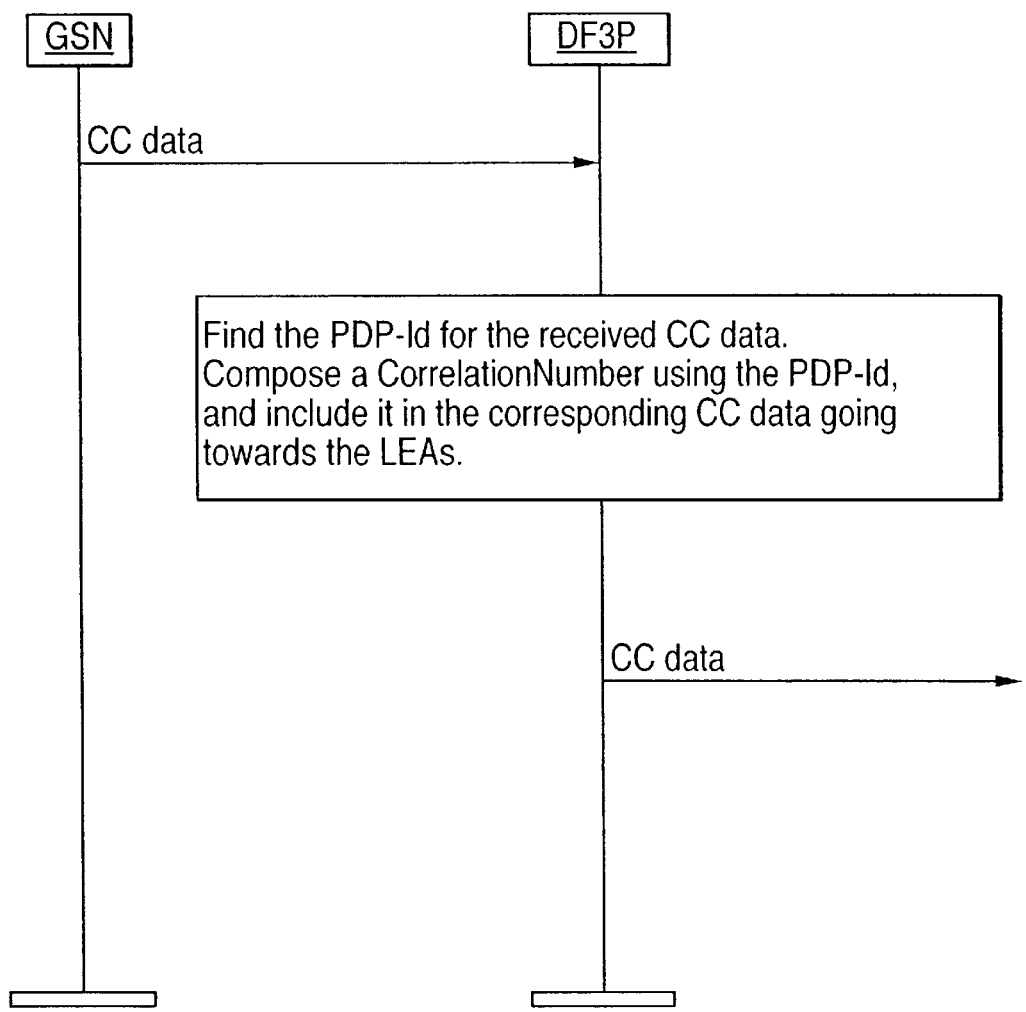
FIG. 11 illustrates the transfer of CC data from the GGSN or SGSN to the LEAs in accordance with an embodiment of the present invention.

FIG. 11 illustrates the handling of CC data. As illustrated in FIG. 11, the CC data is initially forwarded from the GGSN or SGSN to the delivery function DF3P which finds the PDP-ID for the received CC data and composes a correlation number using the PDP-ID and includes it in the corresponding CC data to be forwarded to the LEA. The CC data is then forwarded to the LEA.

Figure 12:
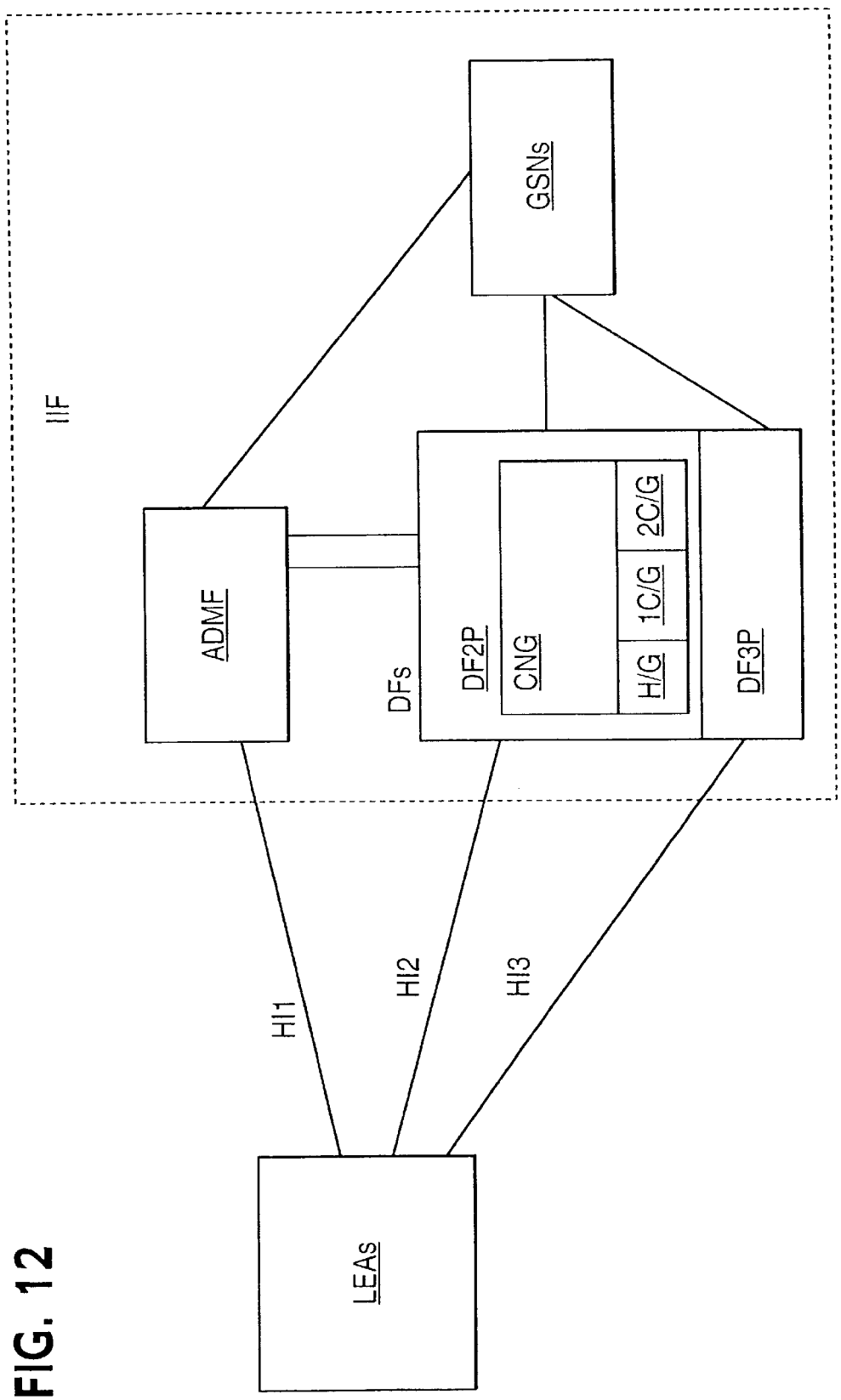
FIG. 12 illustrates the network of an embodiment of the present invention.

FIG. 12 illustrates a network of one embodiment of the present invention. The figure shows the LEAs and IIF which includes ADMF, GSNs (i.e. SGSNs, and GGSNs) and the delivery functions DFs. The figure further shows the interfaces H1, H2 and H3 as well as the interfaces within the IIF. The IIF of FIG. 12 comprises delivery functions DF2P and DF3P. It should be noted that the delivery functions may also be arranged to be separated into different network elements.

It should also be noted that FIG. 12 does not show any separate mediation functions CC MF and IRI MF because they are optional and the inventive solution may as well be implemented without the mediation functions. The interfaces between delivery functions and LEAs are implemented in the embodiment of FIG. 12 by connecting delivery functions to the LEAs via the LEMF (not shown in the figure).

Further in accordance with FIG. 12, each delivery function DF2P and DF3P comprise correlation number generator CNG which further comprises handler/generator H/G for handling the event and generating the unique PDP-ID in response thereto. CNG comprises also the first combiner/generator 1C/G to combine the mobile country code MCC and mobile network code MNC for generating an operator-ID. The CNG still further comprises the second combiner/generator 2C/G to combine the generated PDP-ID and the generated Operator-ID and the DF-ID to generate the correlation number.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reason of variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

We claim:

1. A method of generating a correlation number for use in lawful interception of telecommunications traffic, the method comprising following steps:

handling an event and generating a unique PDP-ID (Packet Data Protocol Context Identifier) in response thereto;

identifying an MCC (Mobile Country Code) of a network operator;

identifying an MNC (Mobile Network Code) of the network operator;

identifying a DF (Delivery Function)-ID of a DF;

combining the MOO and MNC to generate an Operator-ID; and combining the generated PDP-ID and the generated Operator-ID and the DF-ID to generate a correlation number.

2. The method of claim 1, wherein the PDP-ID comprises 4 octets.

3. The method of claim 2, wherein the Operator ID comprises 3 octets.

4. The method of claim 3, wherein the DF-ID comprises one octet.

5. The method of claim 2, wherein the DF-ID comprises one octet.

6. The method of claim 1, wherein the Operator-ID comprises 3 octets.

7. The method of claim 6, wherein the DF-ID comprises one octet.

8. The method of claim 1, wherein the DF-ID comprises one octet.

9. The method according to claim 1, wherein the event is a PDP (Packet Data Protocol) context activation.

10. The method according to claim 1, wherein the event is a Start of intercept(ion) with PDP context active.

11. The method according to claim 1, wherein generating a unique PDP-ID (PDP Context Identifier) comprises incrementing a PDP-ID of a previous PDP context activation or Start of intercept (ion) with P1W context active event and comparing a resultant PDP-ID with all PDP-IDs in use and continuing incrementing until a resultant PDP-ID is different from all PDP-IDs in use.

12. A network including a correlation number generator to generate a correlation number for use in lawful interception of telecommunications traffic, the network comprising:
   at least one LEA (Law Enforcement Agency) and;
   an IIF (Internal Interception Function) including 20 DFs (Delivery Functions) to transmit lawfully intercepted communications traffic to said LEA, said correlation number generator being included in said DFs and comprising:
      a handler/generator to handle an event and to generate a unique PDP-ID (PUP Context Identifier) in response thereto;
      a first identifier to identify an MCC (Mobile Country Code) of a network operator;
      a second identifier to identify an MNC (Mobile Network Code) of the network operator;
      a third identifier to identify a DF (Delivery Function)-ID of a DF;
      a first combiner/generator to combine the MCC 15 and MNC to generate an Operator-ID; and
      a second combiner/generator to combine the generated PDP-ID and the generated Operator-ID and the DF-ID to generate a correlation number.

13. The network of claim 12, wherein the PDP-ID comprises 4 octets.

14. The network of claim 13, wherein the Operator-ID comprises 3 octets.

15. The network of claim 14, wherein the DF-ID comprises one octet.

16. The network of claim 13, wherein the DF-ID comprises one octet.

17. The network of claim 12, wherein the Operator-ID comprises 3 octets.

18. The network of claim 17, wherein the DF-ID comprises one octet.

19. The network of claim 12, wherein the DF-ID comprises one octet.

20. The network of claim 12, wherein the system further comprises a LEMF (Law Enforcement Monitoring Facility) to transmit lawfully intercepted telecommunications traffic to said at least one LEA.

21. The network according to claim 12, further comprising an IRI (Intercept Related Information) ME (Mediation Function) to forward IRI of lawfully intercepted telecommunications traffic to said at least one LEA via said LEME.

22. The network according to claim 12, further comprising a CC (Content of Communication) ME to forward CC of lawfully intercepted telecommunications traffic to said at least one LEA via said LEMF.

23. The network according to claim 22, wherein said lawfully intercepted communications traffic is transmitted to said LEA via at least one of said IRI MF and said CC MF.

24. The network of claim 12, wherein said event is a PDP (Packet Data Protocol) context activation.

25. The network of claim 12, wherein said event is a Start of intercept(ion) with PDP context active.

26. The network of claim 12, wherein several delivery functions are disposed in one network element.

27. The network according to claim 12, wherein the handler/generator generates a unique PDP-ID (PDP Context Identifier) by incrementing a PDP-ID of a previous PDP context activation or Start of intercept (ion) with PDP context active event and comparing a resultant PDP-ID with all PDP-IDs in use and continuing incrementing until a resultant PDP-ID is different from all PDP-ID5 in use.

* * * * *